(12) United States Patent
Miura et al.

(10) Patent No.: US 9,531,479 B2
(45) Date of Patent: Dec. 27, 2016

(54) METHOD OF MONITORING WAVELENGTH OF OPTICAL SIGNAL OUTPUT FROM LIGHT EMITTING ELEMENT AND OPTICAL SIGNAL MONITORING CIRCUIT

(71) Applicant: SUMITOMO ELECTRIC INDUSTRIES, LTD., Osaka (JP)

(72) Inventors: Tomoko Miura, Yokohama (JP); Keiji Tanaka, Yokohama (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 185 days.

(21) Appl. No.: 14/285,063

(22) Filed: May 22, 2014

(65) Prior Publication Data

US 2014/0348502 A1 Nov. 27, 2014

(30) Foreign Application Priority Data

May 24, 2013 (JP) ................................. 2013-109746

(51) Int. Cl.
*H04B 10/04* (2006.01)
*H04B 10/572* (2013.01)

(52) U.S. Cl.
CPC .................................. *H04B 10/572* (2013.01)

(58) Field of Classification Search
CPC ... H04B 10/564; H04B 10/516; H04B 10/572; H04B 10/5057; H04B 10/0795; H04B 10/07955; H04B 10/07957
USPC ....... 398/182, 183, 186, 188, 192, 193, 194, 398/195, 196, 197, 198, 200, 201, 33, 38, 398/34, 202, 208, 209, 135, 136, 158, 398/159; 372/32, 34, 36, 38.02, 29.01, 372/29.02, 20, 26
See application file for complete search history.

(56) References Cited

U.S. PATENT DOCUMENTS 6,067,181 A * 5/2000 Mizrahi ................... H01S 5/141
398/1
6,400,737 B1 * 6/2002 Broutin ................. H01S 5/0687
372/20

FOREIGN PATENT DOCUMENTS

JP 2002-185074 6/2002
JP 2002-324937 11/2002

* cited by examiner

*Primary Examiner* — Hanh Phan
(74) *Attorney, Agent, or Firm* — Smith, Gambrell & Russell, LLP.

(57) ABSTRACT

An optical signal monitor circuit includes a PD which directly detects an optical signal and converts the optical signal into a photocurrent, and another PD which detects the optical signal and converts the optical signal into a photocurrent. A resistance element converts the photocurrents into voltages for input to an operational amplifier which outputs voltages based on the voltages generated by the resistance element. A switching control circuit switches a connection between the PDs and the resistance element, and a calculation circuit acquires the output of the operational amplifier converted to digital signals such that the switching control circuit controls switching to cause the two photocurrents to flow into the resistance element at individual timings and to cause the two photocurrents to flow into the resistance element at the same timing, and the calculation circuit calculates a corrected digital signal by subtracting with the obtained digital signals.

4 Claims, 8 Drawing Sheets

METHOD OF MONITORING WAVELENGTH OF OPTICAL SIGNAL OUTPUT FROM LIGHT EMITTING ELEMENT AND OPTICAL SIGNAL MONITORING CIRCUIT

BACKGROUND

Field of the Invention

The present invention relates to a method of monitoring an output wavelength of an optical signal, and an optical signal monitoring circuit.

Background Art

In the field of optical communication, with the advance of a DWDM (Dense Wavelength Division Multiplexing) system, a wavelength spacing of individual channels becomes narrow, and highly precise control of an output wavelength of each optical signal to be handled is desired. For example, an optical transmitter described in Patent Document 1 below has a function of controlling an output wavelength output from a wavelength-variable light source element included therein. Specifically, this optical transmitter includes a first photodetector which directly receives an optical signal from the wavelength-variable light source element and converts the optical signal into an electrical signal, a second photodetector which receives the optical signal through an etalon filter and converts the optical signal into another electrical signal, and an AFC circuit which controls an output wavelength of the wavelength-variable light source element based on these electrical signals. With such a configuration, it is possible to control the output wavelength by detecting a part of the optical signal through the etalon filter using one of the two photodetectors, directly detecting a part of the optical signal using the other photodetector, acquiring wavelength information of the optical signal from a ratio of the detection results, and adjusting a set value of the wavelength-variable light source element using a value of wavelength deviation obtained from the wavelength information.

Further, a circuit configuration for monitoring an optical signal output from a semiconductor laser is shown in Patent Document 2 below. As the configuration of the circuit for monitoring an optical signal, a configuration in which a monitor current output from a light receiving element is converted into an electrical signal using a resistor and an operational amplifier is generally known, as shown in the document.

Patent Document 1: Japanese Patent Laid-Open No. 2002-185074

Patent Document 2: Japanese Patent Laid-Open No. 2002-324937

When a general configuration of the circuit for monitoring an optical signal described in Patent Document 2 above is applied to the optical transmitter described in Patent Document 1 above, the following problems occur. In other words, a positive input and a negative input of the operational amplifier included in the circuit are ideally virtually grounded, but an error is actually caused due to a process variation in the operational amplifier. This error is generated as an offset voltage in the output of the operational amplifier. Also, when the currents generated from two photodetectors are converted into voltages through the resistor, the offset voltage of the operational amplifier may be added to wavelength information to be obtained and precision of the wavelength information may be degraded.

SUMMARY

A method of monitoring an output wavelength of the optical signal according to an aspect of the present invention is a method of monitoring a wavelength of an optical signal by converting photocurrents generated by two light receiving elements which receive the optical signal into digital signals corresponding to the respective photocurrents, the method including: individually flowing the respective photocurrents into a resistance element and acquiring voltages generated in the resistance element through an operational amplifier as first and second digital signals; flowing the respective photocurrents into the resistance element at the same time and acquiring a voltage generated in the resistance element through the operational amplifier as a third digital signal; and acquiring a corrected digital signal by subtracting the second digital signal from the third digital signal and another corrected digital signal by subtracting the first digital signal from the third digital signal.

Alternatively, an optical signal monitoring circuit according to another aspect of the present invention is an optical signal monitoring circuit including: a first light receiving element which directly detects an optical signal output from a light emitting element and converts the optical signal into a first photocurrent; a second light receiving element which detects the optical signal through an optical element having wavelength dependence and converts the optical signal detected through the optical element into a second photocurrent having wavelength dependence; a resistance element which converts the first and second photocurrents into voltages, an operational amplifier which outputs the voltage generated by the resistance element; a switching circuit unit which switches a first connection between the first light receiving element and the resistance element and a second connection between the second light receiving element and the resistance element; and a calculation circuit unit which converts the output of the operational amplifier into a digital signal, wherein the switching circuit unit controls switching of the first and second connections to flow only the first photocurrent into the resistance element at a first timing, to flow only the second photocurrent into the resistance element at a second timing, and to flow the first and second photocurrents into the resistance element at the same time at a third timing, and wherein the calculation circuit unit calculates a corrected digital signal of the first photocurrent by subtracting the digital signal obtained at the second timing from the digital signal obtained at the third timing, a corrected digital signal of the second photocurrent by subtracting the digital signal obtained at the first timing from the digital signal obtained at the third timing.

DETAILED DESCRIPTION

A method of monitoring an output wavelength of the optical signal according to an aspect of the present invention is a method of monitoring a wavelength of an optical signal by converting photocurrents generated by two light receiving elements which receive the optical signal into digital signals corresponding to the respective photocurrents, the method including: individually flowing the respective photocurrents into a resistance element and acquiring voltages generated in the resistance element through an operational amplifier as first and second digital signals; flowing the respective photocurrents into the resistance element at the same time and acquiring a voltage generated in the resistance element through the operational amplifier as a third digital signal; and acquiring a corrected digital signal by subtracting the second digital signals from the third digital signal and another corrected digital signal by subtracting the first digital signal from the third digital signal.

Alternatively, an optical signal monitoring circuit according to another aspect of the present invention is an optical signal monitoring circuit including: a first light receiving element which directly detects an optical signal output from a light emitting element and converts the optical signal into a first photocurrent; a second light receiving element which detects the optical signal through an optical element having wavelength dependence and converts the optical signal detected through the optical element into a second photocurrent having wavelength dependence; a resistance element which converts the first and second photocurrents into voltages, an operational amplifier which outputs the voltage generated by the resistance element; a switching circuit unit which switches a first connection between the first light receiving elements and the resistance element and a second connection between the second light receiving element and the resistance element; and a calculation circuit unit which converts the output of the operational amplifier into a digital signal, wherein the switching circuit unit controls switching of the first and second connections to flow only the first photocurrent into the resistance element at a first timing, to flow only the second photocurrent into the resistance element at a second timing, and to flow the first and second photocurrents into the resistance element at the same time at a third timing, and wherein the calculation circuit unit calculates a corrected digital signal of the first photocurrent by subtracting the digital signal obtained at the second timing from the digital signal obtained at the third timing, a corrected digital signal of the second photocurrent by subtracting the digital signal obtained at the first timing from the digital signal obtained at the third timing.

According to the method of monitoring an output wavelength of the optical signal or the optical signal monitoring circuit, the photocurrents received by the two light receiving elements flow into the resistance element at an individual timing, and the resultant voltages are acquired as two digital signals through the operational amplifier. On the other hand, photocurrents received by the two light receiving elements flow into the resistance element at the same time, the resultant voltage is acquired as a digital signal through the operational amplifier, and the two digital signals obtained by individually flowing the photocurrents into the resistance element, are individually subtracted from the digital signal obtained by flowing the two photocurrents into the resistance element at the same time, such that monitor values of the photocurrents of the two light receiving elements in which the offset voltage of the operational amplifier has been canceled can be obtained. As a result, it is possible to improve the monitor precision of the output wavelength of the optical signal.

Further, it is preferable for the method to further include changing a resistance value of the resistance element and for the resistance element to be a variable resistor. In addition, it is preferable for the resistance element to be a variable resistor and for the switching circuit unit to perform control to change a resistance value of the resistance element. In this case, even when intensity of the optical signal fluctuates, it is possible to stably maintain the monitor precision of the output wavelength of the optical signal.

Hereinafter, embodiments of the method of monitoring an output wavelength of an optical signal and the optical signal monitoring circuit according to the present invention will be described in detail with reference to the accompanying drawings. Further, the same elements are denoted with the reference signs in the description of the drawings and a repeated description is omitted.

Figure 1:
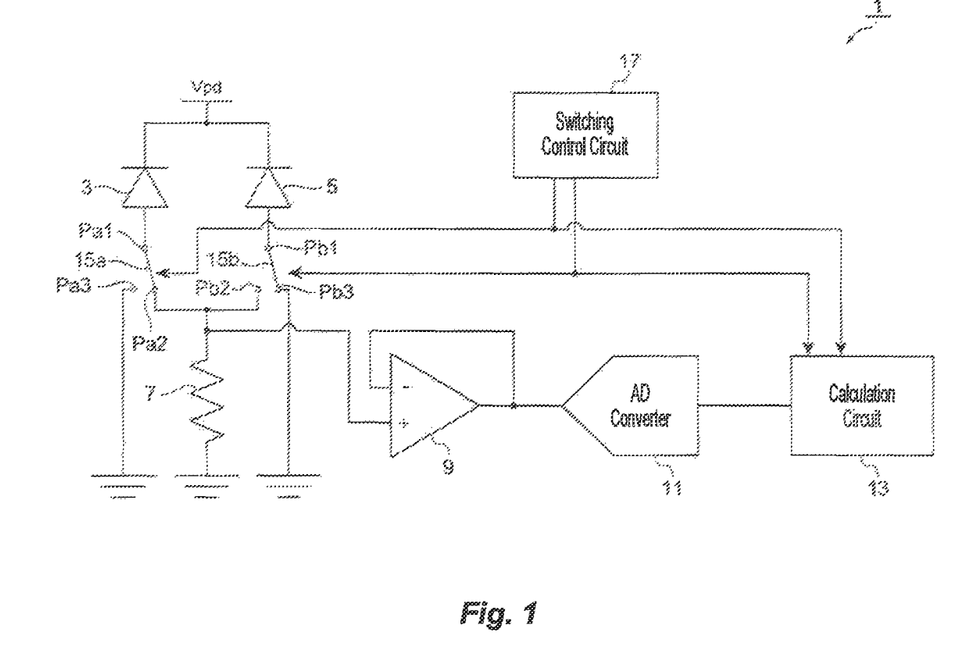
FIG. 1 is a circuit diagram illustrating a configuration of an optical signal monitoring circuit according to a preferred embodiment of the present invention.

FIG. 1 is a circuit diagram illustrating a configuration of an optical signal monitoring circuit according to a preferred embodiment of the present invention. This optical signal monitoring circuit 1 is built in an optical transmitter used in optical communication, and is a circuit which monitors an output state of an optical signal output from the light emitting element, such as a semiconductor laser, which is not illustrated. As illustrated in FIG. 1, the optical signal monitoring circuit 1 includes photodiodes (hereinafter referred to as "PDs") as light receiving elements 3 and 5, a resistance element 7, an operational amplifier (differential amplifier) 9, an AD converter (a calculation circuit unit) 11, a calculation circuit (the calculation circuit unit) 13, switching elements (a switching circuit unit) 15a and 15b, and a switching control circuit (the switching circuit unit) 17.

The PDs 3 and 5 are light receiving elements included in a wavelength locker constituting the optical transmitter. The PD 3 directly receives (detects) a part of the optical signal and converts the received optical signal into a photocurrent, and the PD 5 receives a part of the optical signal through an optical element having wavelength dependence with respect to the optical signal, such as an etalon filter, and converts the received optical signal detected through the optical element into a photocurrent having wavelength dependence. A fixed voltage Vpd is supplied to cathode terminals of the PDs 3 and 5, and contacts Pa1 and Pb1 on one terminal side of the switching elements 15a and 15b are connected to anode terminals of PDs 3 and 5, respectively. The resistance element 7 has a specific resistance value set in advance, and one end of the resistance element 7 is connected with contacts Pa2 and Pb2 on the other terminal side of the switching elements 15a and 15b, and other end of the resistance element 7 is connected with a ground point (ground). This resistance element 7 is an element which converts the photocurrent generated by the PDs 3 and 5 into a voltage.

Further, contacts Pa3 and Pb3 on the other terminal side of the switching element 15a and 15b are directly connected to the ground point. Also, the switching elements 15a and 15b have a function of receiving switching signals SEL1 and SEL2 from the switching control circuit 17, switching a connection between the PD 3 and the resistance element 7, and another connection between the PD 5 and the resistance element 7. In other words, the switching element 15a connects/disconnects the anode terminal of the PD 3 and the resistance element 7 in a path of the photocurrent generated by the PD 3 by switching a connection between the contact Pa1 and one of the contacts Pa2 and Pa3. In addition, the switching element 15b connects/disconnects the anode terminal of the PD 5 and the resistance element 7 in a path of the photocurrent generated by the PD 5 by switching a connection between the contact Pb1 and one of the contacts Pb2 and Pb3. With such a configuration of the switching elements 15a and 15b, when the switching element 15a is turned on, the photocurrent generated by the PD 3 flows into the ground point through the resistance element 7, and when the switching element 15a is turned off, the photocurrent generated by the PD 3 directly flows into the ground point. Similarly, when the switching element 15b is turned on, the photocurrent generated by the PD 5 flows into the ground point through the resistance element 7, and when the switching element 15b is turned off, the photocurrent generated by the PD 5 directly flows into the ground point. Accordingly, the path on which the photocurrent flows is always secured regardless of switching states of the switching elements 15a and 15b.

The operational amplifier 9 outputs a voltage drop generated by the resistance element 7 in a state in which impedance is reduced. In other words, a positive input terminal of the operational amplifier 9 is electrically connected to the contacts Pa2 and Pb2 of the switching elements 15a and 15b and the terminal on the switching elements 15a and 15b side of the resistance element 7, and a negative input terminal of the operational amplifier 9 is electrically connected to an output terminal of the operational amplifier 9. The output terminal of this operational amplifier 9 is connected to the AD converter 11, and a voltage output from the operational amplifier 9 is converted into a digital signal by the AD converter 11 and output. In this case, an output voltage of the operational amplifier 9 is the summation of the input voltage of the positive input terminal of the operational amplifier 9, which corresponds to the voltage drop generated in the resistance element 7, and an offset voltage ±Vofs generated in the operational amplifier 9, and a digital signal of the output voltage is output from the AD converter 11.

The switching control circuit 17 controls switching of the switching elements 15a and 15b by providing the switching signals SEL1 and SEL2 to the switching elements 15a and 15b. Here, the switching control circuit 17 controls switching of the switching elements 15a and 15b so that the photocurrents of the PDs 3 and 5 flow into the resistance element 7 at individual timings, and controls switching of the switching elements 15a and 15b so that the photocurrents of the PDs 3 and 5 flow into the resistance element 7 at the same timing. Specifically, the switching control circuit 17 switches the switching element 15a to the contact Pa2 and simultaneously switches the switching element 15b to the contact Pb3 at the first timing. At the first timing, only the photocurrent of the PD 3 flows into the resistance element 7. In addition, the switching control circuit 17 switches the switching element 15a to the contact Pa3 and simultaneously switches the switching element 15b to the contact Pb2 at the second timing. At the second timing, only the photocurrent of the PD 5 flows into the resistance element 7. Further, the switching control circuit 17 switches the switching element 15a to the contact Pa2 and simultaneously switches the switching element 15b to the contact Pb2 at the third timing. At the third timing, both the photocurrents of the PDs 3 and 5 flow into the resistance element 7 at the same time.

The calculation circuit 13 generates wavelength information of the optical signal by correcting three digital signals output via the operational amplifier 9 and the AD converter 11, based on these digital signals at the first to third timings, and outputs the wavelength information to a circuit of a subsequent stage which is not illustrated.

Figure 2:
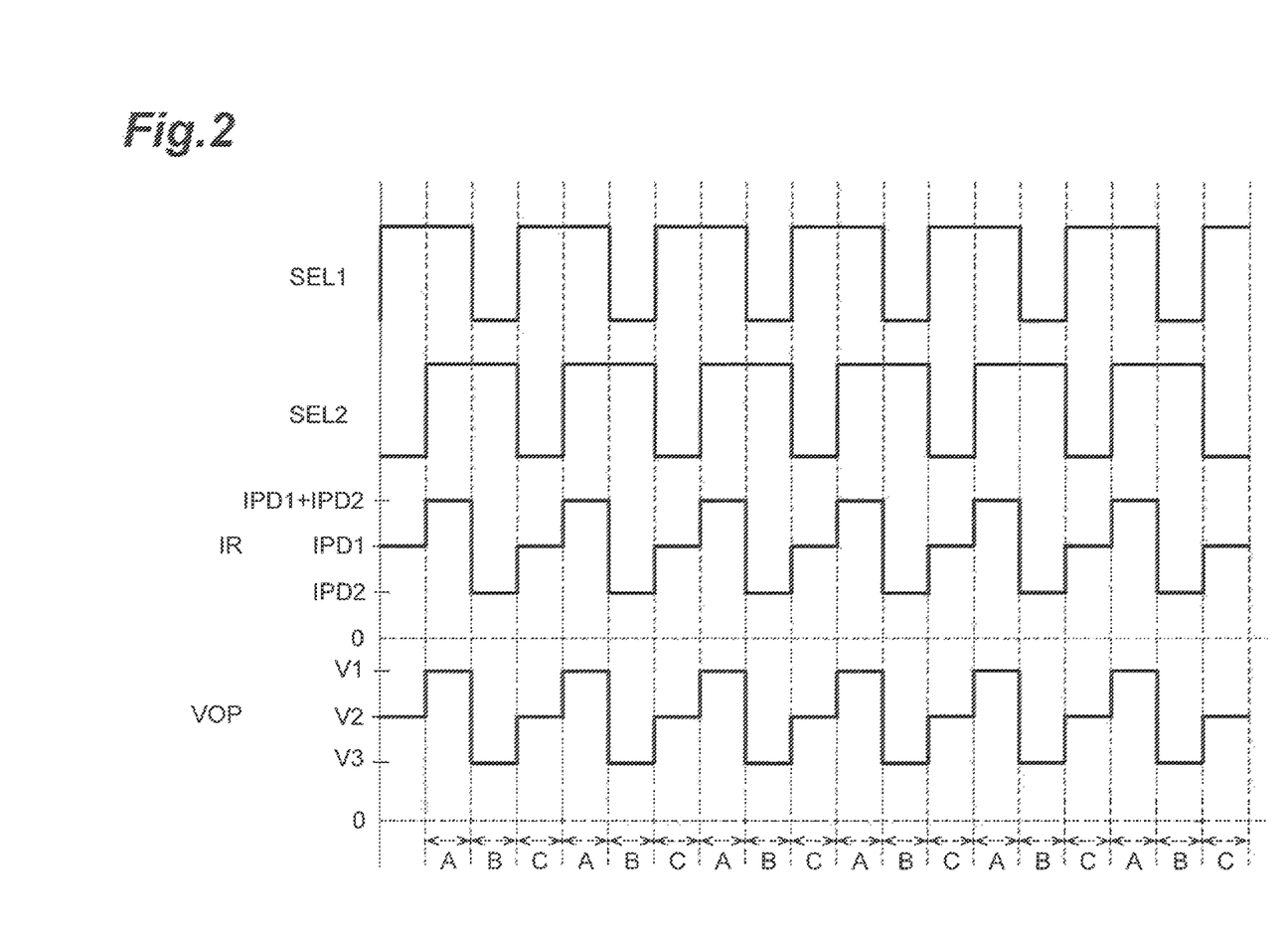
FIG. 2 is a timing chart of various signals handled by an optical signal monitoring circuit 1 of FIG. 1.

Next, an operation of the optical signal monitoring circuit 1 will be described and a method of monitoring an output wavelength of an optical signal according to this embodiment will be described in detail. FIG. 2 is a timing chart of various signals handled by the optical signal monitoring circuit 1.

As illustrated in FIG. 2, levels of the switching signals SEL1 and SEL2 are set to change by the switching control circuit 17 at a timing of a period A (a third timing), a timing of a period B (a second timing), and a timing of a period C (a first timing), and the level change in the periods A to C is periodically repeated. At the timing of the period A, the switching signals SEL1 and SEL2 are set to a high level at the same time, the switching elements 15a and 15b are connected to the resistance element 7 at the same time, and a current which is a sum of the current IPD1 generated by the PD 3 and the current IPD2 generated by the PD 5 flows into the resistance element 7. As a result, the value IR of the current flowing through the resistance element 7 is set as IR=IPD1+IPD2. Accordingly, a voltage drop generated by the current IR flowing through the resistance element 7 is output as the output voltage Vop=V1 by the operational amplifier 9. In this case, when the offset voltage generated in the operational amplifier 9 is ±Vofs and a resistance value of the resistance element 7 is R3, the output voltage V1 output from the operational amplifier 9 is shown as Equation (1) below:

$$V1 = (IPD + IPD2) \times R3 \pm Vofs \quad (1)$$

Meanwhile, at the timing of the period B, the switching signal SEL1 is set to a low level and the switching signal SEL2 to a high level at the same time, and thus only the switching element 15b is connected to the resistance element 7 and only the current IPD2 generated by the PD 5 flows into the resistance element 7. As a result, the value IR of the current flowing through the resistance element 7 is set as IR=IPD2. Accordingly, a voltage drop generated by the current IR flowing through the resistance element 7 is output as the output voltage Vop=V3 by the operational amplifier 9. In this case, the output voltage V3 output from the operational amplifier 9 is shown in Equation (2) below:

$$V3 = IPD2 \times R3 + Vofs \quad (2)$$

On the other hand, at a timing of the period C, the switching signal SEL1 is set to a high level and the switching signal SEL2 to a low level at the same time, and thus only the switching element 15a is connected to the resistance element 7 and only the current IPD1 generated by the PD 3 flows into the resistance element 7. As a result, a value IR of the current flowing through the resistance element 7 is set as IR=IPD1. Accordingly, a voltage drop generated by the current IR flowing through the resistance element 7 is output as the output voltage Vop=V2 by the operational amplifier 9. In this case, the output voltage V2 output from the operational amplifier 9 is as shown in Equation (3) below:

$$V2 = IPD1 \times R3 \pm Vofs \quad (3)$$

In these periods A, B and C, the output voltages V1, V3 and V2 output from the operational amplifier 9 are converted into digital signals D1, D3 and D2 by the AD converter 11, and these digital signals D1, D3 and D2 are acquired by the calculation circuit 13. When n is resolution of the AD converter 11 and ADCref is a reference voltage provided to the AD converter 11, a value of the digital signal Dx (x=1, 2, 3) acquired by the calculation circuit 13 is set as Equation (4) below:

$$Dx = Vx \times (2^n - 1)/ADCref (x=1,2,3) \quad (4)$$

Further, at a timing at which one cycle of the periods A, B and C has passed, the calculation circuit 13 temporarily holds the digital values D1, D2 and D3 output in time division from the AD converter 11, and subtracts the digital value D3 from the digital value D and the digital value D2 from the digital value D1, respectively, to acquire corrected digital signals MON1 and MON2. These corrected digital signals MON1 and MON2 correspond to the monitor values of the photocurrents of the PDs 3 and 5, respectively. Specifically, the calculation circuit 13 acquires the corrected digital signal MON1 calculated using Equation (5) below:

$$MON1 = D1 - D3 = (V1 - V3) \times (2^n - 1)/ADCref = \quad (5)$$
$$\{(IPD1 + IPD2) \times R3 \pm Vofs - (IPD2 \times R3 \pm Vofs)\} \times$$
$$(2^n - 1)/ADCref = IPD1 \times R3 \times (2^n - 1)/ADCref$$

The calculation circuit 13 also acquires the corrected digital signal MON2 calculated using Equation (6) below:

$$MON2 = D1 - D2 = (V1 - V2) \times (2^n - 1)/ADCref = \quad (6)$$
$$\{(IPD1 + IPD2) \times R3 \pm Vofs - (IPD1 \times R3 \pm Vofs)\} \times$$
$$(2^n - 1)/ADCref = IPD2 \times R3 \times (2^n - 1)/ADCref$$

Further, the calculation circuit 13 generates a monitor value (wavelength information) MON of the output wavelength of the optical signal based on the obtained corrected digital signals MON1 and MON2. In other words, the calculation circuit 13 generates and outputs the monitor value MON by performing digital calculation using Equation (7) below:

$$MON = MON2/MON1 = IPD2/IPD1 \quad (7)$$

The monitor value MON is not affected by the offset voltage, as seen from the above equation.

Figure 3:
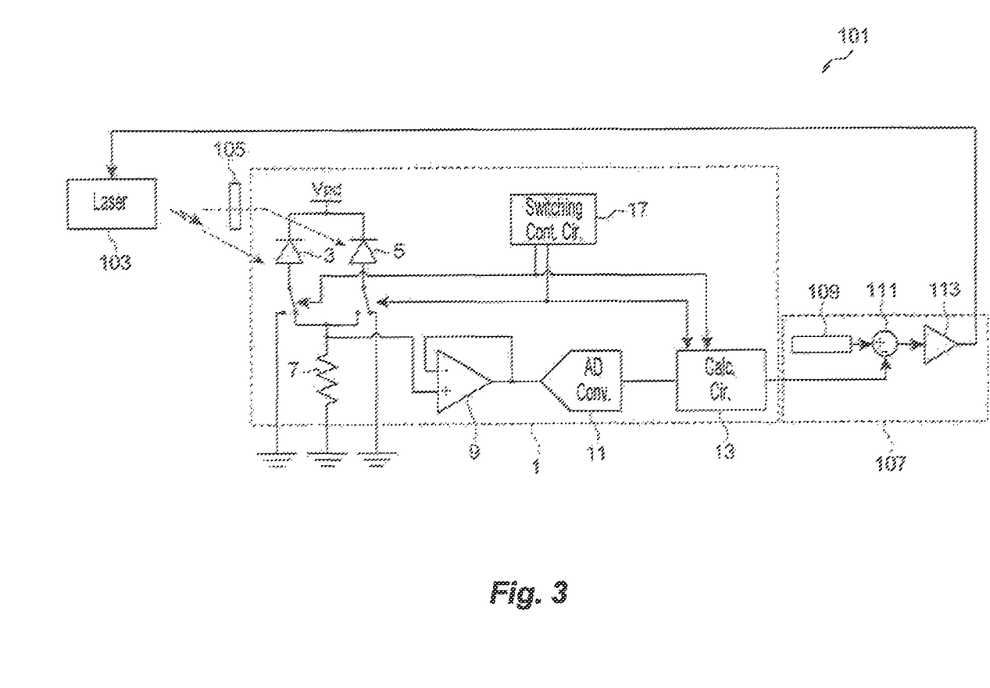
FIG. 3 is a circuit diagram illustrating a configuration of an optical transmitter 101 including the optical signal monitoring circuit 1 of FIG. 1.

A configuration example of an optical transmitter when the optical signal monitoring circuit 1 described above has been applied to the optical transmitter is illustrated in FIG. 3. The optical transmitter 101 illustrated in FIG. 3 includes a wavelength-variable semiconductor laser 103 as a light emitting element which outputs an optical signal, an etalon filter 105 provided on an optical path to which a part of the optical signal is branched between the wavelength-variable semiconductor laser 103 and the optical signal monitoring circuit 1, the optical signal monitoring circuit 1, and a wavelength control circuit 107 which controls an output wavelength of the wavelength-variable semiconductor laser 103 based on a monitor value MON of an output wavelength of the optical signal output from the optical signal monitoring circuit 1. This wavelength control circuit 107 includes a storage unit 109 which stores wavelength target value data, a subtractor 111, and an amplifier (or an integrator) 113, and generates, using the subtractor 111, a difference between the monitor value MON calculated in the calculation circuit 13 and the wavelength target value acquired and stored in advance at the time of initial adjustment, inputs the obtained difference to the amplifier 113 having a high gain, and gives an output value of the amplifier 113 to an area having a wavelength adjustment function in the wavelength-variable semiconductor laser 103. Thus, if the monitor value MON of the output wavelength is controlled to be fed back to the wavelength-variable semiconductor laser 103, highly precise control of the output wavelength of the wavelength-variable semiconductor laser 103 can be realized.

According to the optical signal monitoring circuit 1 described above, the photocurrents IPD1 and IPD2 received by the two PDs 3 and 5 flow into the resistance element 7 at individual time-division timings, and the resultant voltages V2 and V3 are acquired through the operational amplifier 9 to calculate the two digital signals D2 and D3, respectively. On the other hand, the photocurrents IPD1 and IPD2 received by the two PDs 3 and 5 flow into the resistance element 7 at the same time, the resultant voltage V1 is acquired through the operational amplifier 9 to calculate the digital signal D1, and the two digital signals D2 and D3 obtained by individually flowing the photocurrents IPD1 and IPD2 into the resistance element 7 are subtracted from the digital signal D1 to thereby obtain the monitor value of the photocurrents IPD1 and IPD2 of the two PDs 3 and 5 in which the offset voltage of the operational amplifier 9 has been canceled. As a result, it is possible to improve monitor precision of the output wavelength of the optical signal.

Effects of the optical signal monitoring circuit 1 of this embodiment will be described in detail through a comparison with a conventional example. A configuration of an optical signal monitoring circuit 901 of the conventional example is illustrated in FIG. 8.

Figure 8:
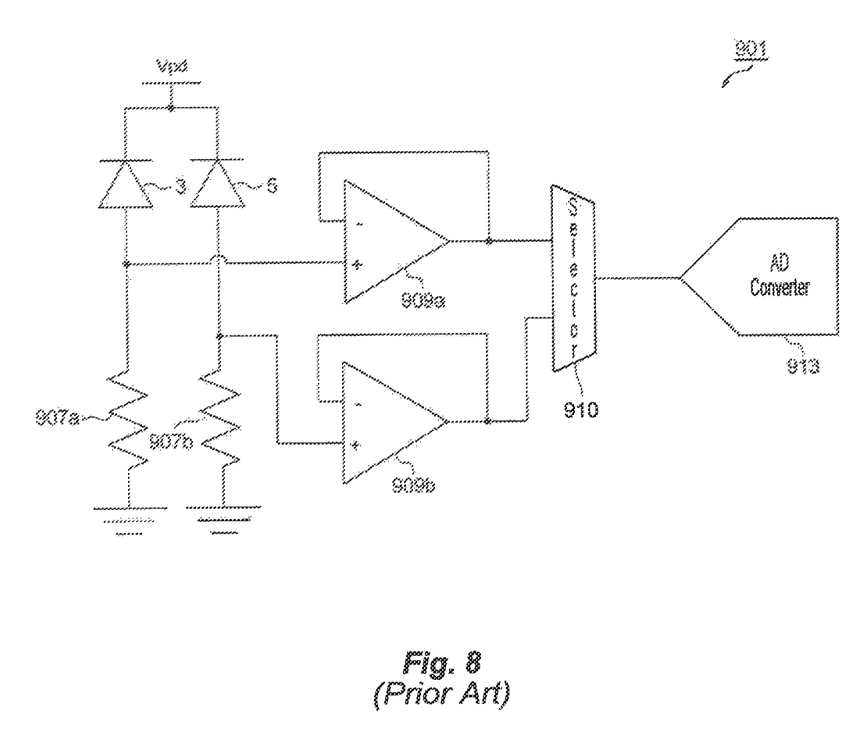
FIG. 8 is a circuit diagram illustrating a configuration of an optical signal monitoring circuit in a conventional example.

A conventional general optical signal monitoring circuit 901 illustrated in FIG. 8 includes resistance elements 907a and 907b and operational amplifiers 909a and 909b which convert photocurrents in PDs 3 and 5 into voltages, a selector circuit 910, and an AD converter 913. Specifically, the resistance elements 907a is connected between anode of the PD 3 and a ground point, and the resistance element 907b is connected between anode of the PD 5 and a ground point. In addition, positive input terminals of the operational amplifiers 909a and 909b are connected to the anodes of the PDs 3 and 5 and the resistance elements 907a and 907b, respectively, and respective output terminals thereof are connected to the selector circuit 910. The selector circuit 910 selects output voltages of the operational amplifiers 909a and 909b in time division and inputs the output voltage to the AD converter 913. The AD converter 913 converts each output voltage into a digital signal and outputs the digital signal to a circuit unit of a subsequent stage.

In such an optical signal monitoring circuit 901, if photocurrents IPD1 and IPD2 generated from the PDs 3 and 5 are converted into voltages, when a resistance value of the resistance element 907a is R1, a resistance value of the resistance element 907b is R2, and offset voltages generated in the operational amplifiers 909a and 909b are ±Vofs1 and ±Vofs2, a monitor value MON3 of an output wavelength can be obtained from the voltages, as shown in Equation (8) below:

$$MON3 = (IPD2 \times R2 \pm Vofs2)/(IPD1 \times R1 + Vofs1) \quad (8)$$

Thus, since precision of the monitor value of the output wavelength is degraded due to generation of the offset voltages ±Vofs1 and ±Vofs2, and particularly, values of photocurrents IPD1 and IPD2 decrease when light output is low, an SN ratio of the wavelength monitoring value is degraded. On the other hand, in the optical signal monitoring circuit 1 of this embodiment, using one resistor and two switches for the PDs 3 and 5, the current flowing into the resistor is switched in time division to acquire the voltage corresponding to each photocurrent, and a difference between the voltages is acquired to remove an influence of the offset voltage, thereby improving the precision of the wavelength monitor.

Further, the present invention is not limited to the embodiment described above. For example, various configurations can be applied as the connection configuration of the optical signal monitoring circuit 1.

Figure 4:
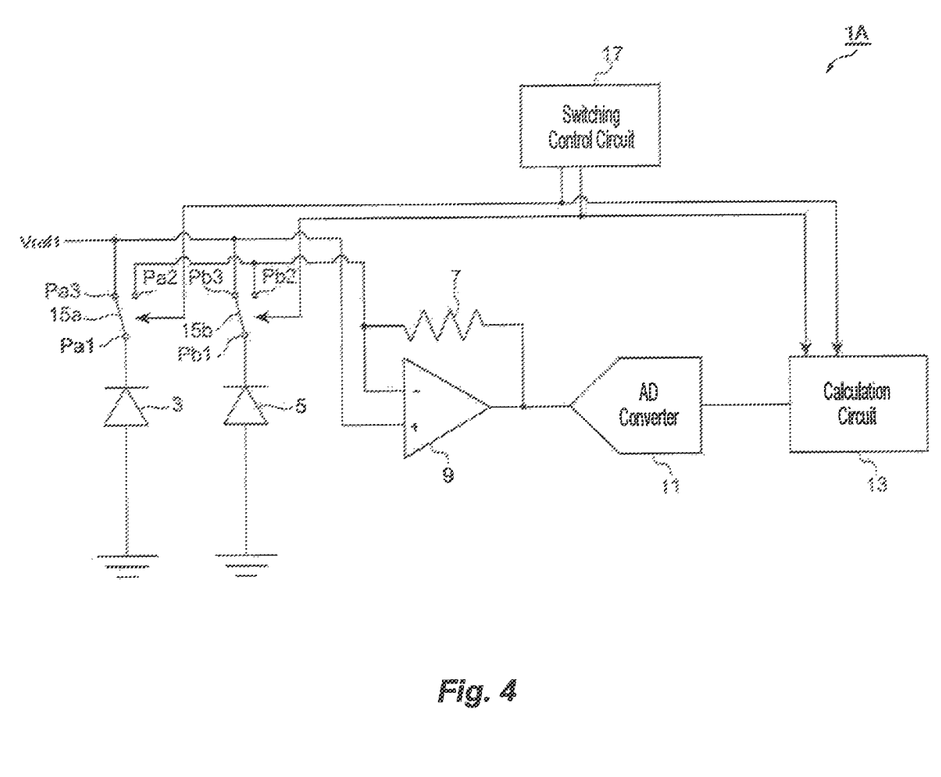
FIG. 4 is a circuit diagram illustrating a configuration of an optical signal monitoring circuit LA according to a variant of the present invention.

For example, in the present invention, a connection configuration as illustrated in FIG. 4 may also be applied. An optical signal monitoring circuit 1A according to a variant of the present invention illustrated in FIG. 4 adopts a configuration of a transimpedance amplifier in which a resistance element 7 is connected between a negative input terminal and an output of an operational amplifier 9. In other words, anodes of the PDs 3 and 5 are connected to a ground point, and cathodes of the PDs 3 and 5 are connected to either a positive input terminal or a negative input terminal of the operational amplifier via switching elements 15a and 15b. Also, a specific voltage Vref1 is applied to the positive input terminal of the operational amplifier 9 and contacts Pa3 and Pb3 connected when the switching elements 15a and 15b are turned off, and thus the PDs 3 and 5 are always biased with a voltage close to the specific voltage Vref1 regardless of states of the switching elements 15a and 15b.

Even with the optical signal monitoring circuit 1A described above, photocurrents IPD1+IPD2, IPD1 and IPD2 flow into the resistance element 7 in time division, resultant voltages V4, V5 and V6 are input to an AD converter 11 and converted into digital values D4, D5 and D6 by the AD converter 11. Since the positive input of the operational amplifier 9 is at the voltage Vref1, a voltage input to the AD converter 11 is greater than that in the optical signal monitoring circuit 1 by Vref1. However, even in the case of the optical signal monitoring circuit 1A, digital values MON1 and MON2 corresponding to output currents of the PDs 3 and 5 obtained from a difference between the digital value D4 and the digital value D6 and a difference between the digital value D4 and the digital value D5 are set to be equal to the values calculated in Equations (5) and (6) above.

Further, a variable resistance element whose resistance value can be set to be variable by a switching signal from the switching control circuit 17 may be used as the resistance element included in the optical signal monitoring circuit 1 or 1A.

Figure 5:
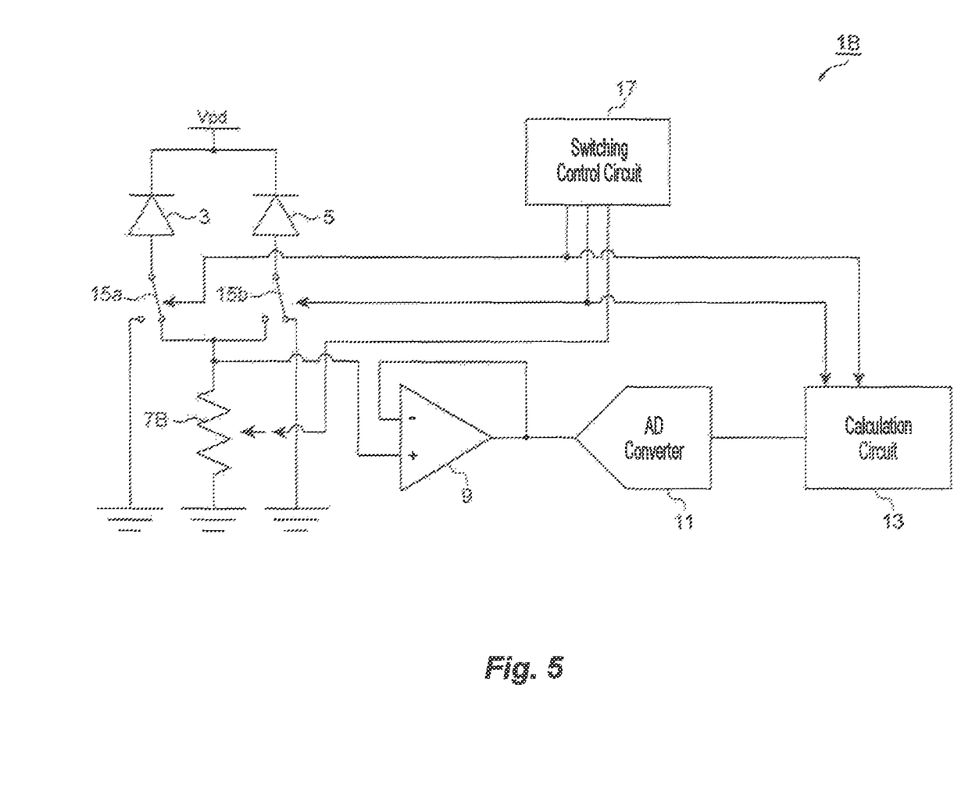
FIG. 5 is a circuit diagram illustrating a configuration of an optical signal monitoring circuit 1B according to a variant of the present invention.

A configuration in which the resistance element 7 included in the optical signal monitoring circuit 1 is replaced with a variable resistance element 7B is illustrated in FIG. 5. When intensity of an optical signal emitted by a light emitting element is small, intensity of the optical signal input to PDs 3 and 5 in a wavelength locker is small and accordingly photocurrents output from the respective PDs 3 and 5 are also small. For example, light output intensity of the wavelength-variable semiconductor laser may gradually increase from a shutdown mode to an operation mode or the light output intensity may gradually decrease from the operation mode to the shutdown mode. In such a case, since the currents output from the respective PDs 3 and 5 are small, obtained monitor values MON1 and MON2 are small, and precision of a monitor value MON of the output wavelength obtained from a ratio of the monitor values MON1 and MON2 is degraded.

In the configuration of FIG. 5, a switching signal SEL is provided from a switching control circuit 17 to set a value of the variable resistance element 7B. Light output intensity of the wavelength-variable semiconductor laser can be roughly estimated from a current amount supplied to the laser, and can also be controlled to be a target intensity through light output control. The switching control circuit 17 performs control to change a resistance value of the variable resistance element 7B according to the output intensity of the laser. Specifically, the switching control circuit 17 sets the resistance value to be relatively greater when the light output intensity is low and sets the resistance value to be relatively smaller when the light output intensity is high. Accordingly, when the light output intensity is low, the voltage value generated in the variable resistance element 7B can increase, and as a result, the monitor precision of the output wavelength can be improved. Here, it is preferable for the resistance value of the variable resistance element 7B to be set so that the voltage value is substantially constant, that is, for the value of the variable resistance element 7B to be controlled to be inversely proportional to the light output intensity. However, since a number of a set value of the variable resistance element 7B is limited in terms of a size of the circuit, a function or a look-up table may be stored in the switching control circuit 17, and the set value of the variable resistance element 7B may be changed so that the output voltage is close to a specific voltage using the function or the look-up table. As the resistance value of the variable resistance element 7B is changed, the monitor values MON1 and MON2 are changed in proportion to the resistance value, but a value which does not depend on the set value of the variable resistance element 7B can be obtained since the monitor value MON of the output wavelength is given as the ratio of the monitor value MON1 and the monitor value MON2 as shown in Equation (7) above.

Figure 6:
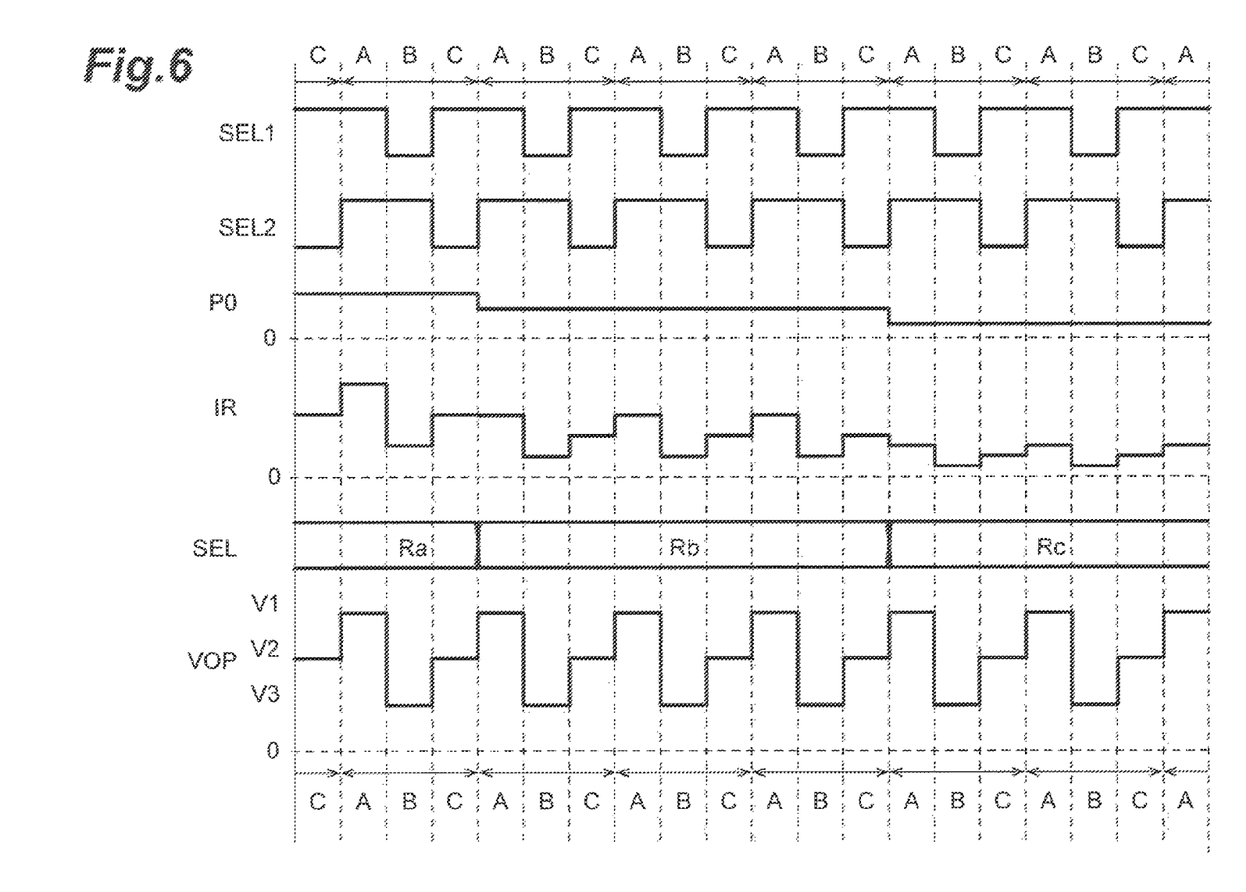
FIG. 6 is a graph illustrating a temporal change of various signal levels handled by the optical signal monitoring circuit 1B of FIG. 5.

FIG. 6 is a timing chart of various signals handled by the optical signal monitoring circuit 1B. Periods A, B and C illustrated in FIG. 6 are periods when currents flowing into the variable resistance element 7B are IPD1+IPD2, IPD2, and IPD1, similar to the periods illustrated in FIG. 2. The calculation circuit 13 calculates the monitor values MON1 and MON2 once every three periods including periods A to C using values of a voltage V1 acquired in the period A, a voltage V3 acquired in the period B, and a voltage V2 acquired in the period C, and acquires the monitor value MON of the output wavelength. In other words, in the optical signal monitoring circuit 1B, the set value of the light output intensity and the set value of the variable resistance element 7B are set to be constant during the three periods, and the switching signal SEL for changing the set value of the variable resistance element 7B are always switched at a timing at which the period C is switched to the period A. Accordingly, it is possible to acquire constantly stable monitor values MON1, MON2 and MON regardless of a change in the light output intensity PO illustrated in FIG. 6.

Figure 7:
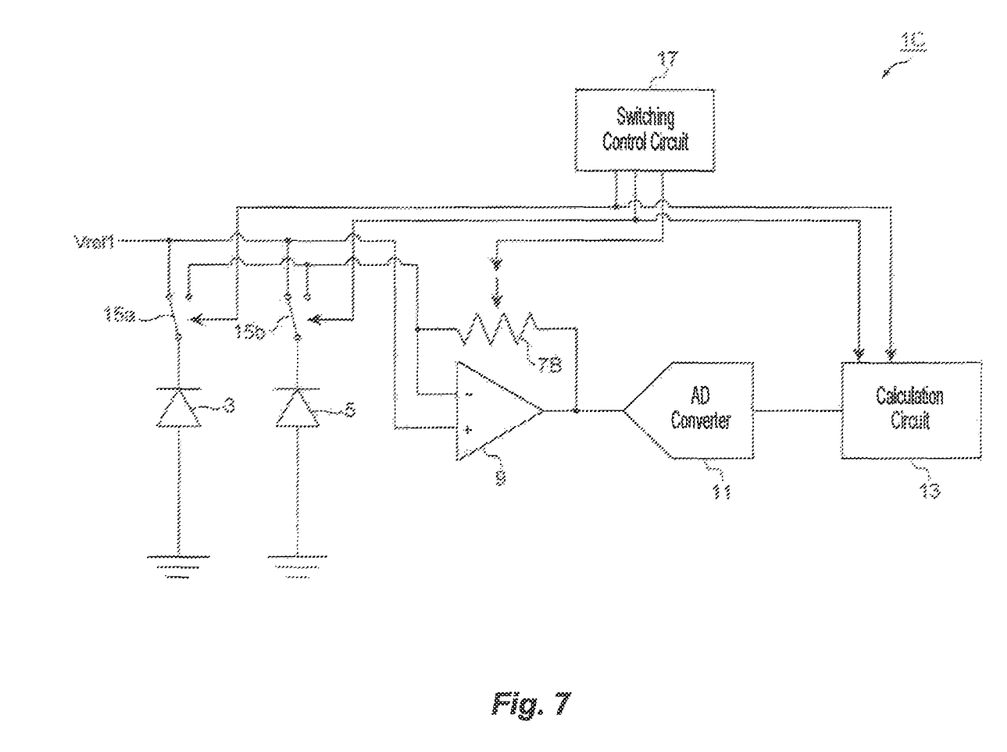
FIG. 7 is a circuit diagram illustrating a configuration of an optical signal monitoring circuit 1C according to a variant of the present invention.

Similarly, a configuration when the optical signal monitoring circuit 1A having the transimpedance amplifier configuration illustrated in FIG. 4 is changed into a configuration including a variable resistance element is illustrated in FIG. 7. Even with the optical signal monitoring circuit 1C illustrated in FIG. 7, it is possible to improve the monitor precision of the output wavelength when the light output intensity fluctuates.

What is claimed is:

1. A method of monitoring an output wavelength of an optical signal by converting photocurrents generated by two light receiving elements which receive the optical signal into digital signals corresponding to the respective photocurrents, the method comprising:

individually causing the respective photocurrents to flow into a resistance element and acquiring voltages generated in the resistance element;

providing the acquired voltages as input to an operational amplifier and converting output from the operational amplifier to obtain first and second digital signals;

causing the respective photocurrents to flow into the resistance element at the same time and acquiring a voltage generated in the resistance element;

providing the acquired voltage as input to the operational amplifier and converting output from the operational amplifier to obtain a third digital signal; and acquiring a corrected digital signal by subtracting the second digital signal from the third digital signal and another corrected digital signal by subtracting the first digital signal from the third digital signal.

2. The method of monitoring an output wavelength of an optical signal according to claim 1, further comprising changing a resistance value of the resistance element, wherein the resistance element is a variable resistor.

3. An optical signal monitoring circuit comprising:

a first light receiving element which directly detects an optical signal output from a light emitting element and converts the optical signal into a first photocurrent;

a second light receiving element which detects the optical signal through an optical element having wavelength dependence and converts the optical signal detected through the optical element into a second photocurrent having wavelength dependence;

a resistance element which converts the first and second photocurrents into voltages;

an operational amplifier which receives as input, the voltages generated by the resistance element, and which provides output based thereon;

a switching circuit unit which switches a first connection between the first light receiving element and the resistance element and a second connection between the second light receiving element and the resistance element, wherein the switching circuit unit controls switching of the first and second connections so that only the first photocurrent flows into the resistance element at a first timing, only the second photocurrent flows into the resistance element at a second timing, and the first and second photocurrents flow into the resistance element at the same time at a third timing; and a circuit that converts the output of the operational amplifier into digital signals and that calculates a corrected digital signal for the first photocurrent by subtracting a digital signal obtained by the circuit at the second timing from a digital signal obtained by the circuit at the third timing, and a corrected digital signal for the second photocurrent by subtracting a digital signal obtained by the circuit at the first timing from the digital signal obtained by the circuit at the third timing.

4. The optical signal monitoring circuit according to claim 3, wherein:

the resistance element is a variable resistor, and the switching circuit unit further performs control to change a resistance value of the resistance element.

\* \* \* \* \*